US007755916B2

(12) United States Patent
Krein et al.

(10) Patent No.: US 7,755,916 B2
(45) Date of Patent: Jul. 13, 2010

(54) METHODS FOR MINIMIZING DOUBLE-FREQUENCY RIPPLE POWER IN SINGLE-PHASE POWER CONDITIONERS

(75) Inventors: Philip T. Krein, Champaign, IL (US); Robert S. Balog, Jr., Champaign, IL (US)

(73) Assignee: SolarBridge Technologies, Inc., Champaign, IL (US)

( * ) Notice: Subject to any disclaimer, the term of this patent is extended or adjusted under 35 U.S.C. 154(b) by 306 days.

(21) Appl. No.: 11/871,015

(22) Filed: Oct. 11, 2007

(65) Prior Publication Data

US 2009/0097283 A1 Apr. 16, 2009

(51) Int. Cl.
*H02J 1/02* (2006.01)
(52) U.S. Cl. ...................................................... 363/39
(58) Field of Classification Search ............. 363/39–41, 363/44–46
See application file for complete search history.

(56) References Cited

U.S. PATENT DOCUMENTS

| | | | |
|---|---|---|---|
| 5,668,464 | A | 9/1997 | Krein et al. |
| 6,489,755 | B1 | 12/2002 | Boudreaux, Jr. et al. |
| 6,535,403 | B1 * | 3/2003 | Jungreis et al. ............... 363/42 |
| 7,289,341 | B2 | 10/2007 | Hesterman |
| 7,339,287 | B2 | 3/2008 | Jepsen et al. |
| 2006/0215429 | A1 * | 9/2006 | Oka et al. ..................... 363/97 |
| 2009/0296348 | A1 | 12/2009 | Russell et al. |

FOREIGN PATENT DOCUMENTS

JP 55068884 * 5/1980

OTHER PUBLICATIONS

Mazumder, et al., "A Ripple-Mitigating and Energy-Efficient Fuel Cell Power-Conditioning System," IEEE Transactions on Power Electronics, Jul. 2007, 1437-1452, 22-4.

Kjaer, et al., "Power Inverter Topologies for Photovoltaic Modules—A Review," IEEE Industry Applications Conference, 2002, 782-788, vol. 2.

Bower, "The AC PV Building Block-Ultimate Plug-n-Play That Brings Photovoltaics Directly to the Customer," Proceedings of the National Center for Photovoltaics (NCPV) and Solar Program Review Meeting, May 2003, 311-314, Denver, CO.

Shimizu, et al., "Flyback-Type Single-Phase Utility Interactive Inverter with Power Pulsation Decoupling on the DC Input for an AC Photovoltaic Module System," IEEE Power Electronics Specialist Conference, 2002, 1483-1488.

(Continued)

*Primary Examiner*—Matthew V Nguyen
(74) *Attorney, Agent, or Firm*—Barnes & Thornburg LLP (57) ABSTRACT

A method is provided for minimizing a double-frequency ripple power exchanged between a load and an energy source, the energy source delivering electrical power to the load through a single-phase power conditioner, and the power conditioner being coupled to an energy storage device. The method senses a first AC waveform at the output of the power conditioner, generates a second AC waveform at the energy storage device, the second AC waveform having the same frequency as the first AC waveform, and shifts the second AC waveform by a phase shift equal to $\pi/4$ radians relative to a phase of the first AC waveform, thereby minimizing the double-frequency ripple power in the power supplied by the energy source.

21 Claims, 3 Drawing Sheets

OTHER PUBLICATIONS

Novaes et al., "Low Frequency Ripple Current Elimination in Fuel Cell Systems," US DoE and IEEE Fuel Cell Seminar—Special Session on Fuel Cell Power Conditioning and International Future Energy Challenge, Nov. 3, 2003, 21-26, Miami, FL.

Kjaer, et al., "A Review of Single-Phase Grid-Connected Inverters for Photovoltaic Modules," IEEE Transactions on Industry Applications, 2005, 1292-1306, 41-5.

Kjaer, et al., "Design Optimization of a Single Phase Inverter for Photovoltaic Applications," IEEE Power Electronics Specialists Conference, 2003, 1183-1190, vol. 3.

Shimizu, et al., "A Flyback-type Single Phase Utility Interactive Inverter with Low-frequency Ripple Current Reduction on the DC Input for an AC Photovoltaic Module System," IEEE, 2002, 1483-1488.

* cited by examiner

METHODS FOR MINIMIZING DOUBLE-FREQUENCY RIPPLE POWER IN SINGLE-PHASE POWER CONDITIONERS

FIELD

The invention relates, generally, to ripple power cancellation in switching power conditioners and, more particularly, to a method for minimizing double-frequency ripple power exchanged between an AC load and an DC energy source through a single-phase AC power conditioner.

BACKGROUND

Many alternative energy sources deliver an approximately constant electrical power over short periods of time which can vary over longer durations based on operating conditions, such as solar energy availability for photovoltaic cells or fuel-supply-based output power from fuel cells. Alternative energy sources include solar panels and fuel cells, which produce power with direct-current (DC), and wind or other rotating or reciprocating generation systems that usually produce power at variable frequency then use a rectifier to produce DC power for power conditioning. This DC electrical power is processed through a power conditioner, generally for conversion to sinusoidal alternating-current (AC) power at fixed frequency, either for delivery to a conventional electricity grid or directly to a load for "off-grid" applications. Typical conversion systems utilized in residences or small businesses generate single-phase AC power, with sinusoidal voltage and current at a fixed nominal frequency.

A basic electrical property of a single-phase AC power system is that the energy flow includes both an average power portion that delivers useful energy from the energy source to the load and a double-frequency portion that flows back and forth between the load and the source. The double-frequency portion represents undesirable ripple power that can compromise performance of the DC power source. Power conditioners for alternative energy systems preferably draw power from the source at the input of the power conditioner without ripple, and in turn deliver both average power and the double-frequency ripple power to the AC load at the electrical output. The conservation of energy principle requires that there exists some physical effect inside the power conditioner to manage this double-frequency ripple power.

Typically, power conditioners used for DC energy sources such as photovoltaic and fuel cells are configured as DC-to-AC converters, and are often referred to as inverters. Practical inverters for single-phase alternative energy systems include filters to manage double-frequency ripple power. The filters are configured to allow double-frequency ripple power to flow at the AC output of the inverter, while minimizing or preventing similar ripple power from flowing back to the DC energy source or otherwise being imposed on the DC energy source.

To manage double-frequency ripple power, energy needs to be stored and delivered at twice the AC frequency. The electrical components needed to store the needed energy are generally large and are well known to be the least reliable components in power inverters. A typical energy storage component is a large electrolytic capacitor, which has well-known failure and wear-out modes that prevent reliable operation over a long lifespan. A typical electrolytic capacitor might have a nameplate rating of 2,000 hours (less than 7 months in a typical solar inverter application) of operation at its maximum temperature and voltage. Since inverters need to operate for longer durations, expensive derating methods, such as those based on the Arrhenius equation, typically limit the operating temperature and operating voltage in order to extend the device lifetime. Still, today's state-of-the-art derating and production methods, well known to one skilled in the art, support inverter warranties of only about 5 years, as observed in the marketplace. Longer warranties usually assume that the electrolytic capacitors will be replaced during the inverter lifetime.

Solar inverters, when rated for outdoor use and co-packaged with the solar panels, often operate at elevated temperatures which accelerate the failure modes and shortens the lifetime of electrolytic capacitors mounted in the inverter. Even though the inverters only run during the part of each day the sun shines, thermal stress prevents the inverters from lasting twenty-five years or more—in contrast to solar panels which often have warranties of 25 or more years. Indeed, manufacturers of inverters for solar power have stated categorically that 20 year inverter life is not possible, largely because of this component issue.

As electrolytic capacitors are well known to be the most significant limitation to power inverter reliability, expectations for poor reliability are evident in the market place: high-power inverters are designed to have replaceable (field serviceable) electrolytic capacitors, new lower-power inverter designs feature easily removable inverter electronics to facilitate repair or replacement, and service contracts are routinely sold with inverters in some markets. While electrolytic capacitors have many failure modes, a major wear-out mechanism is that ripple current causes self-heating which in turn reduces life. Since self-heating is from within, the actual core temperature is higher than the ambient, limiting the effectiveness of active cooling techniques. A typical solution is to use capacitors rated at 105° C. in place of more common 85° C. capacitors but they add 20% to 50% more to the cost and are an incomplete solution.

Many commercially available inverters manage the double-frequency ripple power by using passive filtering in the form of an electrolytic capacitor which is applied at a DC bus where the double-frequency power term translates into ripple on the capacitor. This passive filtering arrangement requires a large capacitance value to filter the double-frequency power, since the necessary energy exchange needs to be supported without imposing significant voltage ripple. Further, since the capacitor maintains a relatively constant voltage, the capacitor current needs to flow at the double-frequency.

In the research community, active filtering circuits are being explored as a more effective alternative to the passive methods. In active filter approaches, ripple current is supplied through a separate power converter. In one common approach, a capacitor is used to maintain a relatively fixed voltage at a separate location within the power conditioner, a so called "internal DC bus." A controller injects a compensating current from this capacitor into the inverter circuit to cancel out the double-frequency ripple power. Since the voltage is held approximately fixed, the compensating current is injected at double the AC line frequency. A typical example injects this compensating current at the terminals of photovoltaic (PV) array.

The active filter method provides two advantages over passive approaches: (1) the capacitor voltage can be higher than the voltage of the PV array, increasing the available energy, and (2) more ripple power can be tolerated on the capacitor than on the PV array. The required capacitance has been shown to be:

$$C = \frac{P}{2\pi f V \Delta V}$$

where P is the average output power, f is the fundamental grid frequency, V is the average capacitor voltage, and ΔV is the allowed peak-to-peak ripple voltage. This method leads to significant capacitance reduction over passive filter approaches. For example, a 1 kW inverter with a 200V capacitor bus voltage, requires only about 440 µF if 15% ripple is allowed on the capacitor. This is a factor of almost 20 reduction over passive filtering, but is still high enough to require large electrolytic capacitors.

Therefore, a need exists for a control technique that minimizes double-frequency ripple power in power conditioners, removes the need for large electrolytic capacitors, increases the lifespan of power conditioners, reduces cost and overcomes other problems previously experienced. These and other needs will become apparent to those of skill in the art after reading the present specification.

SUMMARY

The foregoing problems are solved and a technical advance is achieved by the present invention. Articles of manufacture and systems consistent with the present invention provide a method for minimizing double-frequency ripple power in power conditioners.

A method is provided for minimizing a double-frequency ripple power exchanged between a load and an energy source, the energy source delivering electrical power to the load through a single-phase power conditioner, and the power conditioner being coupled to an energy storage device. The method senses a first AC waveform at the output of the power conditioner, as delivered to the load (or to a single-phase power grid). The method then generates a second AC waveform to be applied to the energy storage device such that the double-frequency ripple power is minimized when the power delivered to the AC load and the energy storage device are added. The generated second AC waveform has the same frequency as the first AC waveform, and is shifted by a phase shift equal to π/4 radians relatively to the AC waveform at the power conditioner output. These choices of frequency and phase, along with the appropriate choice of amplitude, minimize the double-frequency ripple power imposed on the DC energy source.

In one aspect of the invention, the energy storage device is coupled to the power conditioner through an interface which controls a desirable flow of electrical power into and out of the energy storage device.

In another aspect, the second AC waveform is created by alternatively conducting and blocking the flow of power from the energy storage device to the power conditioner. That is, the second AC waveform is approximately generated through switching action, as is well known to those skilled in the art of power electronics.

In another advantageous aspect, a third AC waveform can be used at the energy storage device to minimize the double-frequency ripple power imposed on the DC energy source. This third AC waveform is suitably formed as a piecewise combination of the second AC waveform and its inverse. Advantageously, the third AC waveform can be selected to maintain either positive voltage or positive current on the energy storage device at all times.

An apparatus to implement the method of the invention is provided in the form of a single-phase power conditioner in which the conditioner draws energy from a DC energy source, delivers an AC waveform to an output, and receives a second AC waveform from an energy storage device. The apparatus comprises a sensing unit for sensing a first AC waveform at the output of the power conditioner, and a controlling unit for generating a second AC waveform at the energy storage device, the second AC waveform having the same frequency as the first AC waveform, and for shifting the second AC waveform by a phase shift equal to π/4 radians relative to a phase of the first AC waveform, thereby minimizing the double-frequency ripple power in the power supplied by the energy source.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE DRAWINGS

Reference will now be made in detail to an implementation consistent with the present invention as illustrated in the accompanying drawings. Wherever possible, the same reference numbers will be used throughout the drawings and the following description to refer to the same or like parts.

Figure 1:
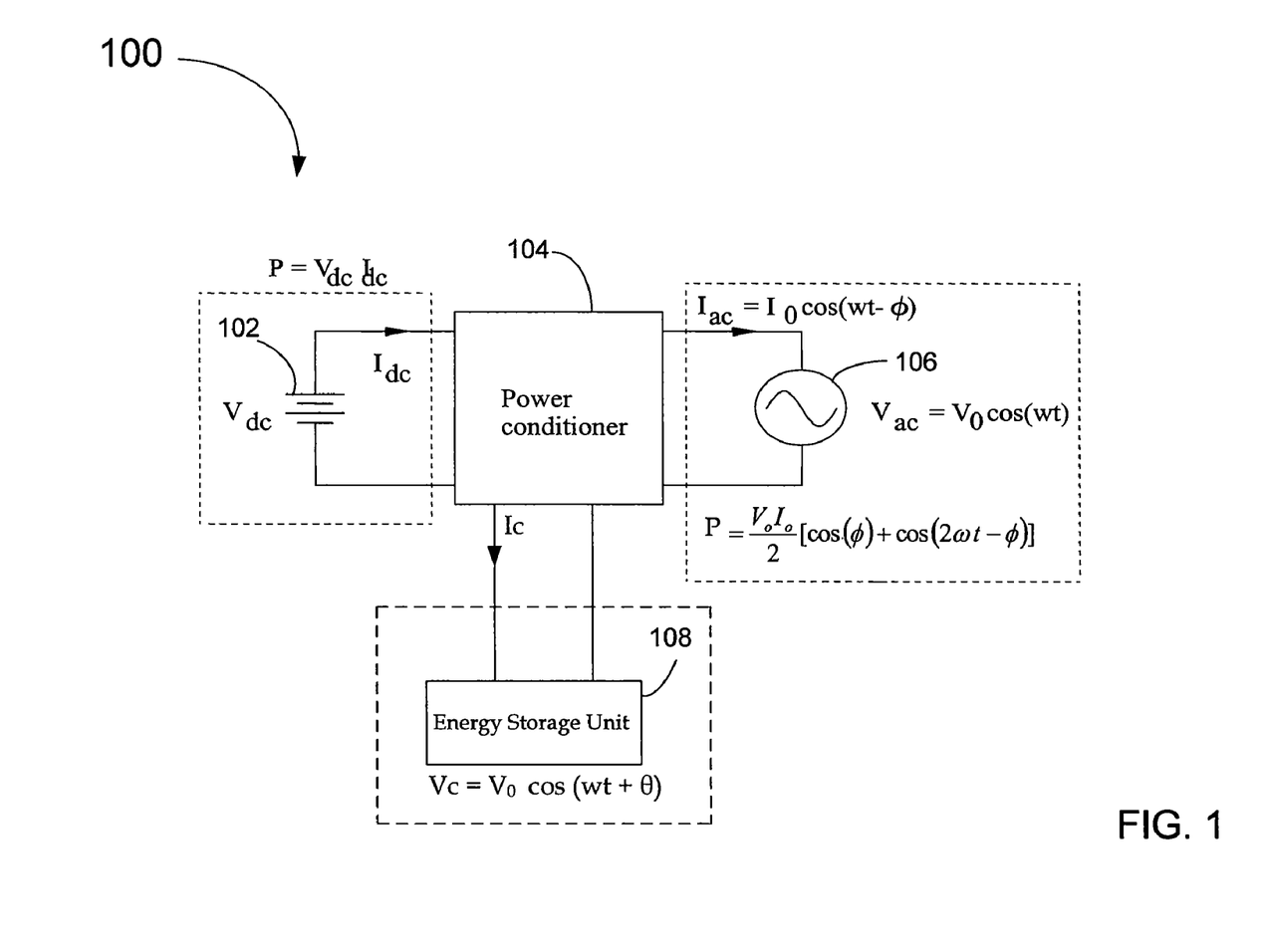
FIG. 1 is a schematic diagram illustrating one embodiment of a power system including a DC energy source connected to an electric AC grid via a single-phase power conditioner, and an energy storage unit consistent with the present invention.

FIG. 1 depicts one embodiment of a single-phase ac power system 100, which includes an energy source unit 102, and a power conditioner 104 which are connected to a single-phase AC load 106 and an energy storage unit 108. The AC load 106 may also be a single-phase connection to the utility power grid. The source unit 102 may be any kind of DC power or DC energy generating system, such as for example a solar panel, solar cell, fuel cell, a wind or rotary generator with a rectifier. The energy storage 108 can be a capacitor, and inductor, an ultra-capacitor or the like. A control integral to the power conditioner 104 can draw maximum power from the energy source 102 whenever power is available and useful. The control acts to maintain operation at an optimum power point, selected for the specific energy source technology. The power conditioner 104 may be a switching power converter, a power inverter and the like. The power conditioner 104 may include a processor programmed with operational instructions.

As stated above, in this single-phase AC power system 100 the energy flow includes both an average power portion that delivers useful energy from the DC energy source 102 to the AC load 106 and a double-frequency portion that flows back and forth between the AC load 106 and the DC source 102. The double-frequency portion represents undesirable ripple power that can compromise performance of the power conditioner 104.

Figure 2:
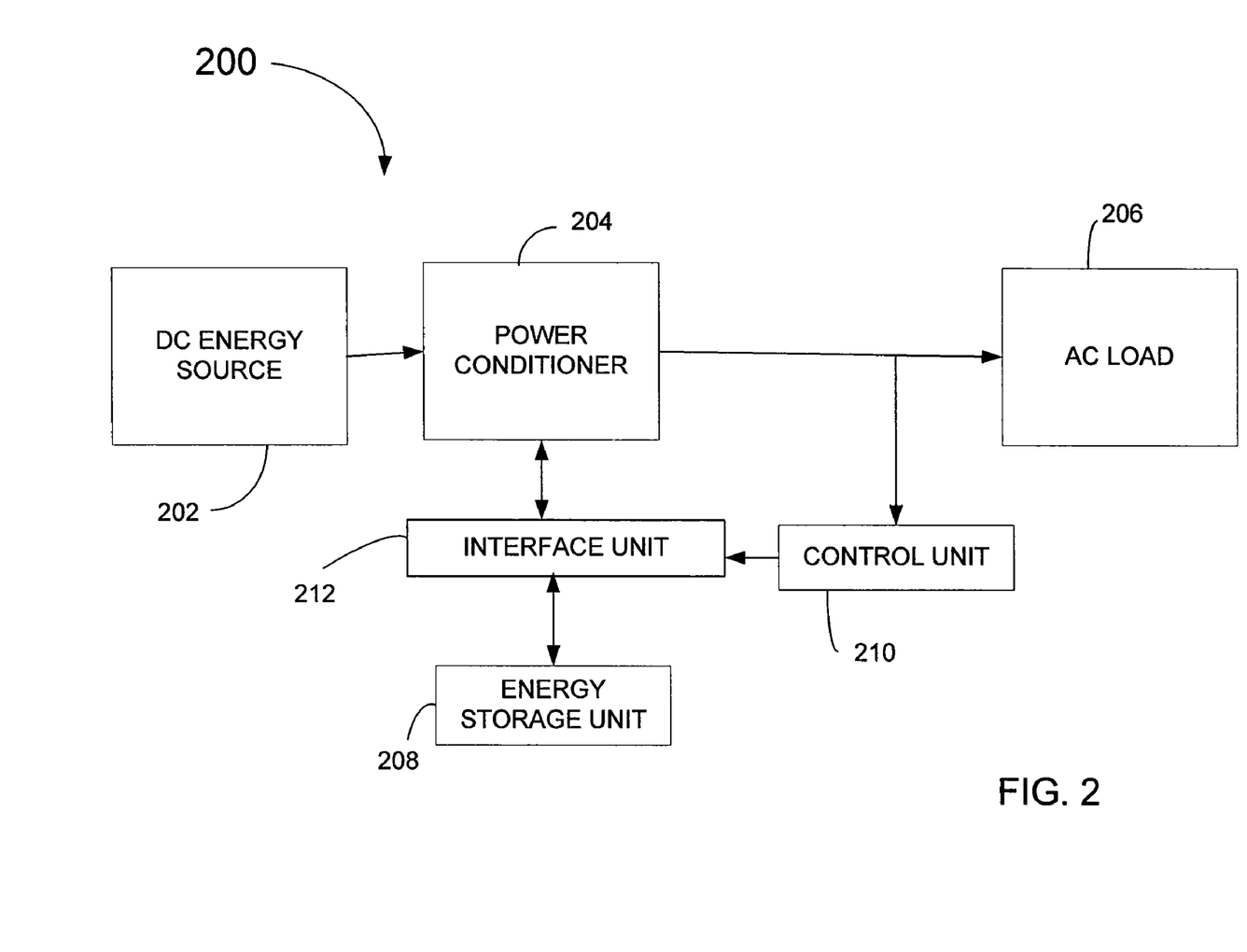
FIG. 2 is a block diagram illustrating the energy storage unit of FIG. 1 coupled to the power conditioner via an interface unit for managing double-frequency ripple power consistent with the present invention.

Now referring to FIG. 2, the energy storage unit 208 is coupled to a control unit 210. To manage this double-frequency ripple power, the coupling of the energy storage unit 208 and the control unit 210 is configured to provide a sinusoidal compensation to the ripple power exchanged between the load 206 and the energy source 202. An interface unit 212, which couples the power conditioner 204 to the energy storage unit 208, is configured to control the flow of electrical energy into and out of the energy storage unit 208. Alternately, the interface unit 212 may be integrated with the power conditioner 204 or with the energy storage unit 208. Alternately, the interface unit 212 and energy storage unit 208 may be integrated with the power conditioner 204. The control unit 210 may be integral to the interface unit 212, which may be a power converter, power inverter, or the like.

To minimize the capacitance needed for double-frequency ripple power, it is vital to use the full range of a capacitor's energy storage. This also applies if inductors or other energy storage devices are being used: all available capacity needs to be employed if the smallest components or capacitor values are to be employed. The requirements are readily computed, and equivalent computations for inductors have been presented in the literature. Consider a single-phase application with an average output power $P_0$ and AC frequency $\omega=2\pi f$. Ignoring for the moment any phase shift between current and voltage, the instantaneous AC output power from the power conditioner 204 to the AC load 206 is:

$$p_0(t)=P_0+P_0\cos(2\omega t) \quad \text{Equation 1}$$

Without loss of generality, only the average portion, $P_0$, of the output power is supplied by the energy source 202. Thus, the storage unit 208 is required to supply the double-frequency term, $P_0 \cos(2\omega t)$ whenever $p_0(t)>P_0$ and store the double frequency term whenever $p_0(t)<P_0$. The required energy storage capacity to store and deliver the ripple power is the time integral of the double-frequency ripple power:

$$W = \int_{t_1}^{t_2} P_o \cos(2\omega s)\,ds \quad \text{Equation 2}$$

Where $t_1$ and $t_2$ define a half-period of the double-frequency ripple and satisfy $p_0(t)=P_0$ such that $t_1<t_2<t_1+\pi/\omega$ during which time energy in the energy storage unit 208 is either being stored or supplied.

Therefore, the stored energy required during a period of the double-frequency ripple is equal to:

$$P_0/\omega \text{ or } P_0/(2\pi f). \quad \text{Equation 3}$$

In a 60 Hz system, the energy requirement in joules is 0.00265 times the average power in watts. For a 100 W converter, the energy storage requirement is 0.265 J, while for a 1 kW inverter, the requirement is 2.65 J. The instantaneous energy stored follows a sinusoidal waveform at 120 Hz, or twice the fundamental AC frequency, even though the voltage and the current waveforms on the capacitor are both oscillating at the fundamental 60 Hz AC frequency.

In an embodiment of the invention where a capacitor is used as the energy storage device 208, the energy storage requirement translates into a capacitor requirement. By definition, a capacitor stores energy according to:

$$W = \frac{1}{2}CV^2 \quad \text{Equation 4}$$

A given peak capacitor voltage and the required energy determines the required capacitor, assuming that the voltage is adjusted over time to follow the necessary energy waveform.

Further, the power conditioner 204 can produce a single-phase sinusoidal voltage $V_{ac}(t)$ such that:

$$v_{ac}(t)=V_0\cos(\omega t) \quad \text{Equation 5}$$

as in FIG. 1. The current delivered to the single-phase electrical load 206 has, in general, a phase shift, and takes the following form:

$$i_{ac}(t)=I_0\cos(\omega t-\phi) \quad \text{Equation 6}$$

As such, the output power into the AC load 206 is:

$$p_o(t) = \frac{V_o I_o}{2}\cos(\phi) + \frac{V_o I_o}{2}\cos(2\omega t - \phi) \quad \text{Equation 7}$$

Turning our attention to the energy storage unit 208, the corresponding capacitor voltage can be controlled to follow a waveform as follows:

$$v_c(t)=V_c\cos(\omega t+\theta) \quad \text{Equation 8}$$

and the corresponding capacitor current is proportional to the time derivative of capacitor voltage:

$$i_c(t) = C\frac{dv_c(t)}{dt} \quad \text{Equation 9}$$

As such, the instantaneous capacitor power $p_c(t)$ is:

$$p_c(t) = -\frac{\omega C V_c^2}{2}\sin(2\omega t + 2\theta) \quad \text{Equation 10}$$

Additionally, the capacitor power can be made equal to the double-frequency ripple power so that the sum of the output power of the power conditioner and the capacitor power contains only the average portion of the load power. The required relationship is:

$$\frac{\omega C V_c^2}{2}\sin(2\omega t + 2\theta) = P_o\cos(2\omega t - \phi) \quad \text{Equation 11}$$

where $P_0$ is the average power supplied to the load.

Appropriate values for $V_c$ and $\theta$ are selected such that the sum of power delivered by the energy source unit 202 and by the capacitor-based energy storage device 208 exactly equals the power supplied to the load $P_0(i)$. From appropriate trigonometric identities, it can be shown that this equality is satisfied when:

$$\frac{\omega C V_c^2}{2} = P_o \text{ and } \theta = \frac{\pi}{4} - \frac{\phi}{2} \qquad \text{Equation 12}$$

This means that if a controlled voltage at the same frequency as the AC line can be delivered to the capacitor of the energy storage unit 208, a phase shift given in terms of θ as above can completely offset the double-frequency ripple power and yield the necessary result. Advantageously, the double-frequency ripple is offset using the minimum amount of capacitance, i.e. the smallest capacitors, which enables the use of more reliable devices such as film capacitors. For example, a 100 W inverter requires an energy storage or capacitance of 26.5 μF if the peak capacitor voltage is 100 V and the correct phase is applied.

A typical single-phase grid-connected solar energy inverter delivers current to the grid without phase shift (unity power factor), in which case φ=0. The phase need for the capacitor voltage is readily found to be θ=45°. The actual time-varying voltage to the capacitor of the energy storage unit 208 can be controlled by any convenient means, such as with pulse-width modulation (PWM). In one embodiment, the energy storage unit 208 can be operated with a separate inverter that operates from its own voltage so as to operate at the desired the peak value $V_c$. The PWM process yields time-varying control of the actual voltage imposed on the capacitor of the energy storage unit 208. The PWM process can be controlled to impose an effective voltage value;

$$v_c(t) = \sqrt{\frac{2P_o}{\omega C}} \cos\left(\omega t + \frac{\pi}{4} - \frac{\phi}{2}\right) \qquad \text{Equation 13}$$

on the capacitor of the energy storage unit 208, provided its separate inverter operates from voltage $V_1$ sufficient to make:

$$V_1 \geq \sqrt{\frac{2P_o}{\omega C}} \qquad \text{Equation 14}$$

Although these expressions contain square roots, the terms under the radical are known parameters, and the power level is predetermined by the capacity of the energy source 202. The radical does not involve rapid time varying functions, and implementation is easy.

The last expression also allows a designer to specify the capacitor value. For example, in a 60 Hz system with 100 W rating, a capacitor of 5 μF can be used if peak voltage of 326 V is available. A capacitor of 2 μF can be employed if the peak voltage exceeds 515 V.

It is significant to point out that a voltage given by the following:

$$v_c(t) = |V_c \cos(\omega t + \theta)| \qquad \text{Equation 15}$$

yields exactly the same set of results. It produces the same instantaneous power and the same requirements for θ and $V_1$. It is also useful to recognize that a minimum inductor and the configuration requirements for an inductor-based filter are analogous to the capacitor. To show this, consider that a purely inductive filter could also be driven with an applied current:

$$i_L(t) = I_L \cos(\omega t + \theta) \qquad \text{Equation 16}$$

Following the treatment above, this will deliver the correct instantaneous power to cancel the variation if:

$$\frac{\omega L I_L^2}{2} = P_o \text{ and } \theta = \frac{\pi}{4} - \frac{\phi}{2} \qquad \text{Equation 17}$$

It is apparent to one skilled in the art that a capacitor driven with a current waveform or an inductor driven with a voltage waveform will yield an alternate solution. For the capacitor of the energy storage unit 208, the following current is applied:

$$i_c(t) = I_c \cos(\omega t + \theta) \qquad \text{Equation 18}$$

Then the instantaneous ripple power is delivered when:

$$\frac{I_c^2}{2\omega C} = P_o \text{ and } \theta = -\frac{\pi}{4} - \frac{\phi}{2} \qquad \text{Equation 19}$$

As in the voltage case, this current can be controlled by means of a PWM process or other suitable method.

Furthermore, combinations of inductors and capacitors are possible. These combinations can alter the required values of L, C, and θ, but the underlying analysis is still valid and can be used to compute the necessary values.

In the discussion above, a specific time-varying voltage, at the same frequency as the AC output, is imposed on the energy storage unit 208 to deliver double-frequency ripple power to its output. The analysis shows that the results lead to the minimum required values of capacitance. The required voltage can be imposed by any suitable method, but an especially advantageous approach is to use a low-loss switching power converter to deliver the voltage. The voltage in turn can be adjusted by means of well-known PWM inverter control processes.

In the single-phase grid-connected power conditioner 204, the phase shift φ is subject to control. For given parameter values for system frequency and capacitance, the only unknown quantity is the average input power $P_0$. This power can be sensed at the output, or it can be treated as the actual commanded power flowing from the solar cells. The implications are that two possible control modes are available. In the first, the value of $P_0$ is treated as an external, known, given value. The proper time-varying voltage or current to be applied is readily computed from this and other known parameters, and is then imposed on the capacitor or inductor. This represents a feed-forward active filter technique. In the second control mode, the power is sensed at the output of the power conditioner 204, either on average or by sensing and multiplication of the measured voltage and current. The time-varying waveform to be imposed on the energy storage unit 208 is generated by means of a 45° phase shift from a waveform half-way between the current and voltage (to yield the angle φ/2). This, in effect, represents a feedback active filter method, a relative conventional implementation approach, even though in this case the actual current or voltage to be delivered is unconventional.

Figure 3:
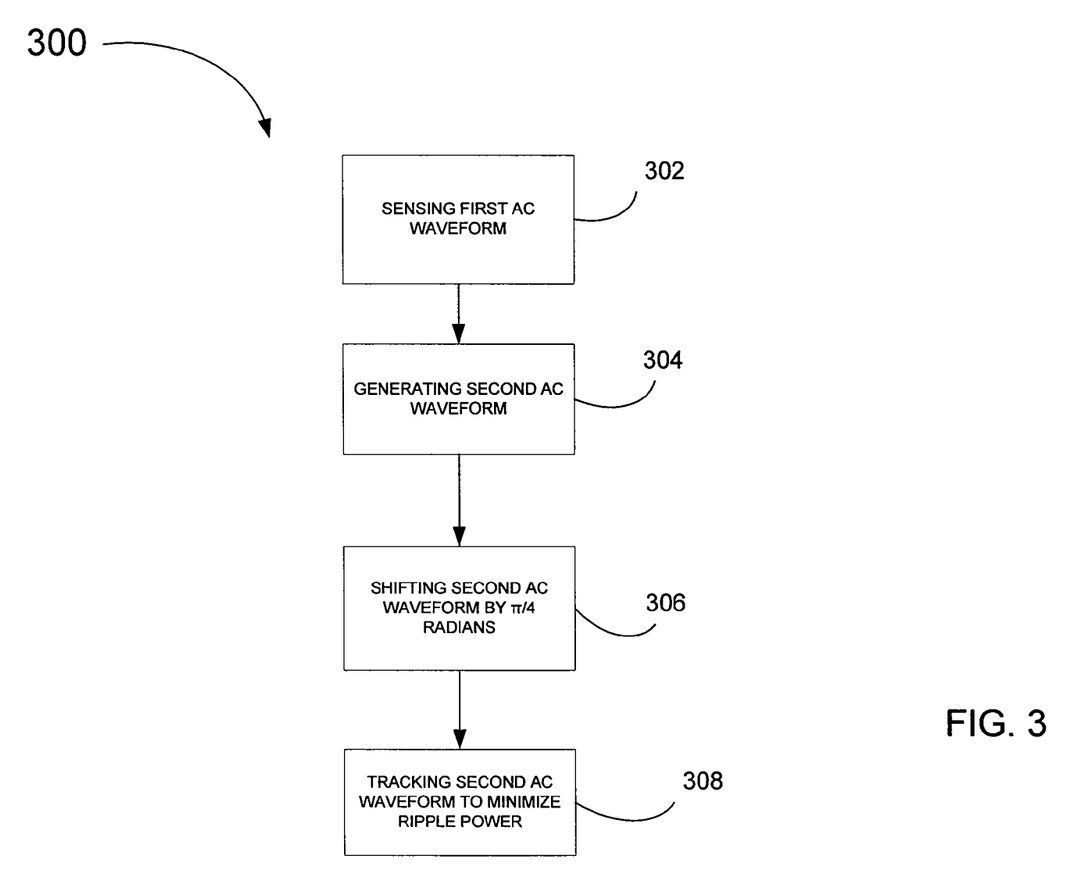
FIG. 3 is a flow chart illustrating a control method for minimizing double-frequency ripple power in the power conditioner consistent with the present invention.

Now referring to FIG. 3, a flow chart 300 illustrating a method for minimizing double-frequency ripple power in the power system 100 is shown. This method begins at step 302 where the system 100 senses a first AC waveform at the output of the power conditioner 204. The method then proceeds to step 304, where a second AC waveform is generated at the energy storage unit 208, the second AC waveform having the same frequency as the first AC waveform. At step 306, the second AC waveform is shifted by a phase shift equal to n/4 radians relative to a phase of the first AC waveform, thereby minimizing the double-frequency ripple power in the power supplied by the energy source 202. In step 308, the electrical energy flowing into and out of the energy storage unit 208 is controlled by appropriate switching action of the interface unit 212 to track the shifted second AC waveform, thereby compensating the double-frequency ripple power.

Therefore, an energy minimization strategy can be used to eliminate electrolytic capacitors as bulk filtering components in alternative energy power conditioners for single-phase applications. The method supports the use of either film capacitors or inductors as energy storage components. New aspects of the invention are as follows:

The demonstration that the inductor and capacitor values given by the analysis are in fact the minimum values that can also deliver the required double-frequency ripple power. The strategy presented here can be rigorously proven to yield the lowest possible energy storage requirement while still delivering all of the ripple power.

Examples of specific waveforms that must be imposed on energy storage components to deliver the desired ripple power. That is, a voltage (or current) waveform at the same frequency as the ac output is to be employed, and that an extra phase shift of 45° is involved.

Implementation of the time-varying waveform in low-loss form via PWM or other known power conversion process. While the general process of using PWM to impose a time-varying waveform is well known, the specific waveforms to be employed are not.

By using minimum-sized energy storage components and appropriate choices of current or voltage, electrolytic capacitors can be avoided.

A highly reliable power conditioner for alternative energy that can be constructed using highly reliable energy storage units.

In summary, if the full capability of energy storage units can be employed, filter components needed in single-phase power conditioners for alternative energy systems can be reduced to the minimum possible values. Once capacitor values below about 50 μF are achieved, it becomes feasible to implement them with film capacitors at reasonable cost. This supports the elimination of electrolytic capacitors, which at present are a major reliability limiter in alternative energy systems. Film capacitors have operating lifetimes about a factor of 1000 longer than electrolytic capacitors. This leads to multi-decade operating life for typical solar inverters and other alternative energy applications.

While various embodiments of the present invention have been described, it will be apparent to those skilled in the art that many more embodiments and implementations are possible that are within the scope of this invention. Accordingly, the present invention is not to be restricted except in light of the attached claims and their equivalents.

The invention claimed is:

1. A method for minimizing a double-frequency ripple power exchanged between a load and an energy source, the energy source delivering electrical power to the load through a single-phase power conditioner, and the power conditioner being coupled to an energy storage device, the method comprising:

sensing a first AC waveform at the output of the power conditioner;

generating a second AC waveform at the energy storage device, the second AC waveform having the same frequency as the first AC waveform; and shifting the second AC waveform by a phase shift equal to about $\pi/4$ radians relative to a phase of the first AC waveform, thereby minimizing the double-frequency ripple power in the power supplied by the energy source.

2. The method of claim 1, wherein the energy storage device is an ultracapacitor, a capacitor, or an inductor.

3. The method of claim 1, wherein the energy storage device is coupled to the power conditioner through an interface which controls a flow of electrical power into and out of the energy storage device.

4. The method of claim 3, wherein the interface is a power converter or a power inverter.

5. The method of claim 1, wherein the energy source is a photovoltaic array, fuel cell, or any other DC energy source.

6. The method of claim 1, wherein the second AC waveform is controlled by alternatively conducting and blocking the flow of power from the energy storage device to the power conditioner.

7. The method of claim 6, wherein the control of the second AC waveform is performed via pulse width modulation (PWM), delta modulation, or hysteretic control.

8. The method of claim 1, wherein the energy storage device is integral to the power conditioner.

9. The method of claim 1, wherein the power supplied from the energy source is the sum of power delivered to the output of the power conditioner and the power delivered to the energy storage device.

10. An apparatus for minimizing a double-frequency ripple power exchanged between a load and an energy source, the energy source delivering electrical energy to the load through a single-phase power conditioner, and the power conditioner being coupled to an energy storage device, the apparatus comprising:

a sensing unit for sensing a first AC waveform at the output of the power conditioner; and a controlling unit for generating a second AC waveform at the output of the energy storage device, the second AC waveform having the same frequency as the first AC waveform, and for shifting the second AC waveform by a phase shift equal to about $\pi/4$ radians relative to a phase of the first AC waveform, thereby minimizing the double-frequency ripple power in the power supplied by the energy source.

11. The apparatus of claim 10, wherein the energy storage device is an ultracapacitor, a capacitor, or an inductor.

12. The apparatus of claim 10, wherein the energy storage device is coupled to the power conditioner through an interface which controls a flow of electrical energy into and out of the energy storage device.

13. The apparatus of claim 12, wherein the interface is a power converter or a power inverter.

14. The apparatus of claim 10, wherein the energy source is a photovoltaic array, fuel cell, or any other dc energy source.

15. The apparatus of claim 10, wherein the second AC waveform is controlled by alternatively conducting and blocking the flow of power from the energy storage device to the power conditioner.

16. The apparatus of claim 15, wherein the control of the second AC waveform is performed via pulse width modulation (PWM), delta modulation, or hysteretic control.

17. The apparatus of claim 10, wherein the energy storage device is integral to the power conditioner.

18. The apparatus of claim 10, wherein the power supplied from the energy source is the sum of power delivered to the output of the power conditioner and the power from the energy storage device.

19. A tangible computer readable medium comprising instructions which when executed by a computer system causes the computer to implement a method for minimizing a double-frequency ripple power exchanged between a load and an energy source, the energy source delivering electrical power to the load through a single-phase power conditioner, and the power conditioner being coupled to an energy storage device, the method comprising the steps of:

sensing a first AC waveform at the output of the power conditioner;

generating a second AC waveform at the output of the energy storage device, the second AC waveform having the same frequency as the first AC waveform; and shifting the second AC waveform by a phase shift equal to about $\pi/4$ radians relative to a phase of the first AC waveform, thereby minimizing the double-frequency ripple power in the power supplied by the energy source.

20. A system for performing a method for minimizing a double-frequency ripple power exchanged between a load and an energy source, the energy source delivering electrical power to the load through a single-phase power conditioner, and the power conditioner being coupled to an energy storage device, the system comprising:

at least one processor programmed to sense a first AC waveform at the output of the power conditioner;

at least one processor programmed to generate a second AC waveform at the output of the energy device, the second AC waveform having the same frequency as the first AC waveform; and at least one processor programmed to shift the second AC waveform by a phase shift equal to about $\pi/4$ radians relative to a phase of the first AC waveform, thereby minimizing the double-frequency ripple power in the power supplied by the energy source.

21. A method for minimizing a double-frequency ripple power exchanged between a load and an energy source, the energy source delivering electrical power to the load through a single-phase power conditioner, and the power conditioner being coupled to an energy storage device, the method comprising the steps of:

sensing a first AC waveform at the output of the power conditioner;

generating a second AC waveform, the second ac waveform having the same frequency as the first AC waveform;

shifting the second waveform to provide an equivalent phase shift equal to about $\pi/4$ radians relative to a phase of the first AC waveform; and generating a third AC waveform at the energy storage device, the third AC waveform having a form that is a piecewise combination of the second AC waveform and its inverse, thereby minimizing the double-frequency ripple power in the power supplied by the energy source, and maintaining either positive voltage or positive current delivered to the energy storage device at all times.

* * * * *